United States Patent
Wilson (10) Patent No.: US 11,292,447 B2
(45) Date of Patent: Apr. 5, 2022

(54) CONFIGURATION OF LANDING GEAR ASSEMBLIES FOR AN AIRCRAFT

(71) Applicant: AIRBUS OPERATIONS LIMITED, Bristol (GB)

(72) Inventor: Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 107 days.

(21) Appl. No.: 16/798,895

(22) Filed: Feb. 24, 2020

(65) Prior Publication Data

US 2020/0298816 A1 Sep. 24, 2020

(30) Foreign Application Priority Data

Feb. 28, 2019 (GB) ..................................... 1902748

(51) Int. Cl.
*B60V 3/08* (2006.01)
*B64C 25/10* (2006.01)
*B64C 25/34* (2006.01)

(52) U.S. Cl.
CPC ................ *B60V 3/08* (2013.01); *B64C 25/10* (2013.01); *B64C 25/34* (2013.01)

(58) Field of Classification Search
CPC .. B60V 3/08; B60V 1/16; B64C 25/10; B64C 25/34; B64C 2025/125
See application file for complete search history.

(56) References Cited

U.S. PATENT DOCUMENTS

| | | |
|---|---|---|
| 3,117,747 A | 1/1964 | Creasey et al. |
| 3,901,988 A | 8/1975 | Coles et al. |
| 3,981,462 A | 9/1976 | Berezhnoi et al. |
| 9,868,521 B2 | 1/2018 | Filho et al. |
| 2011/0204182 A1 | 8/2011 | Prud'Homme-Lacroix et al. |
| 2014/0151500 A1* | 6/2014 | Belief .................... B64C 25/04 244/102 A |
| 2014/0374536 A1* | 12/2014 | Otto ........................ B64C 3/26 244/99.2 |
| 2017/0174329 A1* | 6/2017 | Wilson .................... B64C 25/34 |

FOREIGN PATENT DOCUMENTS

| | | |
|---|---|---|
| EP | 0 319 051 | 6/1989 |
| FR | 1 266 182 | 7/1961 |
| WO | 93/11986 | 6/1993 |

OTHER PUBLICATIONS

Combined Search and Examination Report for GB1902748.1 dated Jul. 31, 2019, 8 pages.
[Online], "The Fifth Column Forum, Air warfare, The Week in Technology", Nov. 27- Dec. 1, 2017, XMB, printed Feb. 16, 2020, 3 pages.

\* cited by examiner

*Primary Examiner* — Rodney A Bonnette
(74) *Attorney, Agent, or Firm* — Nixon & Vanderhye P.C.

(57) ABSTRACT

An aircraft having a retractable landing gear assembly configured to support some of the weight of the aircraft via one or more wheels, and another retractable non-wheeled landing gear assembly or device configured to support some of the weight of the aircraft via one or more "low-friction" supports such as an air cushion is disclosed. The aircraft may have a maximum take-off weight between 100 and 150 tonnes. There may be two main landing gears each carrying two wheels, a nose landing gear, and a central non-wheeled landing gear providing the low friction vertical support when the aircraft is moving on the ground/operating surface.

19 Claims, 6 Drawing Sheets

CONFIGURATION OF LANDING GEAR ASSEMBLIES FOR AN AIRCRAFT

CROSS RELATED APPLICATION

This application claims priority to United Kingdom (GB) Patent Application 1902748.1, filed Feb. 28, 2019, the entire contents of which is hereby incorporated by reference.

BACKGROUND OF THE INVENTION

The present disclosure relates to landing gear assemblies for an aircraft and their configuration. More particularly, but not exclusively, this invention concerns an alternative arrangement of landing gear assemblies on a fixed wing commercial passenger aircraft having a maximum take-off weight of at least 50 tonnes. The invention also concerns a method of operating an aircraft.

An aircraft, for example a fixed wing commercial aircraft of the type arranged to carry at least 50 passengers, requires support on the ground, which may for example be provided by wheeled landing gear assemblies. Airport operators typically place limits on the amount of load that can be supported by a single wheel of the aircraft. Thus heavier aircraft tend to have more wheels than lighter aircraft. Wheels are typically carried by at least three separate landing gear assemblies, each typically carrying at least two wheels each. The use of three wheels on a single landing gear ("LG") is not common. It is generally accepted that arrangements of landing gear on an aircraft should ideally be symmetrical in nature. A port-side landing gear will typically have a symmetrically arranged starboard-side counterpart. When the maximum weight (max take-off weight) of an aircraft is less than 100 tonnes it is common for the aircraft to be supported by three LGs, each carrying two wheels. The next configuration of LGs for a heavier aircraft is commonly to provide each main landing gear ("MLG") with four wheels, using a bogie for that purpose. Moving from six wheels to ten wheels adds significant complexity and mass both to the MLGs and the aircraft.

The present invention seeks to mitigate one or more of the above-mentioned problems. Alternatively or additionally, the present invention seeks to provide an alternative and/or improved configuration of landing gear assemblies and/or aircraft.

SUMMARY OF THE INVENTION

According to a first aspect there is provided an aircraft comprising at least one landing gear assembly configured to support some of the weight of the aircraft via one or more wheels, and at least one landing gear assembly configured to support some of the weight of the aircraft via one or more air cushions. There may be at least three landing gear assemblies. Each landing gear assembly may be a retractable landing gear assembly, being movable between a deployed position and a stowed position. The movement between the deployed position and the stowed position preferably includes rotation of the landing gear assembly about a fixed axis. For the ease of distinguishing between the different landing gears of the aircraft, the label "wheeled LG" will be used as a convenient abbreviation for a landing gear assembly configured to support some of the weight of the aircraft via one or more wheels; and the label "low-friction LG" will be used as a convenient abbreviation for a landing gear assembly configured to support some but not all of the weight of the aircraft via one or more air cushions. It may be that the or each wheeled LG is configured to support some but not all of the weight of the aircraft and that the or each low-friction LG is configured to support some but not all of the weight of the aircraft. It is preferred that the weight of the aircraft is shared between the wheels of the wheeled LG(s) and the air cushion of the low-friction LG(s).

Certain embodiments of the present invention have particular application in relation to an aircraft having a maximum take-off weight (MTOW) of between 80 and 160 tonnes, and optionally between 100 and 150 tonnes, and/or an operating empty weight of between 40 and 110 tonnes. Such aircraft may typically have a MTOW which is marginally too high to enable the aircraft's weight to be supported by only three landing gear each carrying two wheels, being typically a nose landing gear and two symmetrically arranged main landing gear. Such a six-wheel arrangement can be found on Airbus' A320 aircraft for example. A conventional weight bearing configuration of wheeled landing gears up from such a six-wheeled arrangement is a ten-wheeled arrangement by swapping the two-wheeled MLGs (main landing gears) with four-wheeled MLGs. The provision of four-wheeled MLGs, each with an associated landing gear bogie, takes up more space when stowed and adds significantly more weight to the aircraft. An alternative solution would be to provide an eight-wheeled arrangement by the provision of a central landing gear with two wheels. Such a proposal would however require significant structural redesign of the fuselage and associated principal load bearing structures of the aircraft.

The aircraft may have a first wheeled LG as a main landing gear assembly on a port side of the aircraft. The aircraft may have a second wheeled LG as a main landing gear assembly on a starboard side of the aircraft. The or each wheeled LG may be a single axle landing gear with two wheels, typically referred to as a diablo arrangement. The wheeled LGs may, particularly when provided as a MLG, be provided with a brake assembly for applying a braking force to at least one of the wheels of the LG. Thus, a braking force may be applied which provides deceleration of the aircraft in a direction along the ground which is parallel to the longitudinal direction of the aircraft. The wheels of a landing gear are configured to facilitate movement of the aircraft along the ground in a direction that is perpendicular to the axis of the wheel axle. The wheels of a landing gear are also configured to resist movement of the aircraft in a direction along the ground parallel to the wheel axles, by means of the grip of the tyre and frictional forces between tyre and ground. Thus, with a fixed axis (non-steerable for example) wheeled LG—for example one of the MLGs of an aircraft—the LG will facilitate movement of the aircraft along the ground in a longitudinal direction while resisting movement of the aircraft in a direction along the ground perpendicular to the longitudinal direction. By way of contrast, the low-friction LG, by provision of an air cushion, facilitates movement of the aircraft in any direction along the ground, with the frictional forces between the low-friction LG and the ground being substantially the same in all directions parallel to the ground (relatively low, and possibly negligible).

The aircraft may include a wheeled nose landing gear assembly.

The aircraft may be configured for landing and take-off with the use of eight or fewer landing gear wheels. For example, the number of wheels on the landing gears of the aircraft may be between five and eight inclusive.

The aircraft may include only one low-friction LG. The low-friction LG may be a central landing gear. The low-friction LG may be mounted centrally across the width of the aircraft—i.e. at a position in line with the centreline of the aircraft.

The skilled person will appreciate that one function of a landing gear is to support the aircraft as it moves on the ground, during landing, take-off and taxiing, for example. The term landing gear is used herein to refer to structural members that support some of the weight of the aircraft and are designed to do so under dynamic conditions, including at least one of (preferably all of) landing, take-off and taxiing at speeds of more than 30 km/hour.

The aircraft may include a fuselage so arranged that a structural beam, for example an I-beam, extends along the centre line of the fuselage. Such a beam typically extends along a section only of the fuselage, for example for the purpose of strengthening the fuselage in the region where one or more of the wheeled LGs are stowed (for example the main LGs of the aircraft may be stowed in a landing gear bay which requires an interruption in the structure of the fuselage). In the case where an aircraft is designed to have a wheeled landing gear act as a central landing gear, it would typically be necessary to provide such extra strengthening with two parallel beams arranged either side of the centre line of the fuselage so as to allow the central landing gear sufficient room to be stowed. A low-friction LG can be more slender in support structure and therefore require less space for stowage, and may be positioned as a central LG without needing to make significant design modifications to the structure of the aircraft.

The beam may have a cross-sectional shape that varies in the region of a central landing gear (e.g. the low-friction LG). For example the beam may be wider (across the width of the aircraft) but shorter in the vertical direction. The beam may have a recessed portion in the region of where the central landing gear is stowed.

The low-friction LG may include means adapted to provide the air cushion during use. The means for providing the air cushion may include a source of compressed air, optionally one or more ducts and/or structure defining an air-flow path, and one or more outlets at which air is expelled under pressure. The air cushion is created during operation by means of an air-flow. The air-flow may be created at least in part by air taken from engine bleed air. The air-flow may be created at least in part by an air blower. One or more air fans or compressors may be provided for the purpose of creating the air cushion, possibly solely for that purpose. There may be sufficient number of air fans/compressors to provide redundancy. The air fans or compressors may be electrically powered. The low-friction LG may house one or more such air blowers, fans and/or compressors.

The low-friction LG may comprise a skirt adapted to contain the air cushion, during use. The low-friction LG may be adapted to create an annular air cushion. The low-friction LG may comprise a ring of material, for example elastomeric material, adapted to support some of the weight of the aircraft in the absence of the one or more air cushions. The ring of material may be adapted to support some of the weight of the aircraft, when stationery on the ground, for example—and for example not when the aircraft is moving. The ring of material may be in the form of a flexible bladder adapted to be inflated with fluid (air or liquid, for example).

The low-friction LG may comprise a landing gear leg pivotally mounted at one end to the aircraft (the opposite end of the leg including means for providing the air cushion for example). The low-friction LG may comprise a pitch trimmer member. Such a pitch trimmer member may assist with enabling efficient stowage of the low-friction LG in the space provided for that in the aircraft.

The low-friction LG may comprise a main load bearing strut, for example a leg. The low-friction LG may be configured such that the air cushion and any structure for containing the air cushion (for example a skirt) is located only at the distal end of the strut. It is preferred that the strut be visible from the ground (from a position outside of the planform of the entire aircraft) when the low-friction LG is deployed and the aircraft is moving. The (or each) such strut of a low-friction LG may comprise a frangible portion, configured to fail in an emergency case, for example in the event of loss or non-deployment of one of the other landing gear assemblies on landing. Having such a frangible portion could avoid unnecessary damage being caused to the aircraft that might otherwise be caused by an uncontrolled failure of the low-friction LG.

The strut of the low-friction LG may comprise a shock-absorber, for example such as a hydraulic/oleo arrangement.

The total mass added to the aircraft by means of the addition of the low-friction LG and ancillary related equipment, may be less than 1,000 Kg, preferably less than 700 Kg. It is likely that the mass will be greater than 100 Kg, and possibly more than 200 Kg. It is preferred that the total mass of the low-friction LG and any items carried by the low-friction LG equipment (for example any items that move with the LG if and when it moves from the deployed to the stowed position) is less than 900 Kg, preferably less than 700 Kg. It is likely that the mass will be greater than 100 Kg, and possibly more than 200 Kg.

The area of ground covered by the low-friction LG—which may optionally be defined as the area within the largest perimeter of contact (or closest proximity if there is no contact) during average normal use on landing—is preferably less than 20 m$^2$, optionally less than 10 m$^2$.

The aircraft may be a single aisle aircraft. The aircraft may be a passenger aircraft, for example an aircraft configured to carry more than 50 passengers, for example more than 100 passengers In another aspect of the invention there is a provided an aircraft comprising a retractable nose landing gear, two retractable main landing gears, one on the port side of the aircraft and one on the starboard side of the aircraft, and a further retractable landing gear. Each retractable main landing gear includes one or more wheels and has at least one brake assembly for applying a braking force to at least one of the wheels (thus, for example, being able to resist movement of the aircraft in a direction along the ground in the longitudinal direction). The one or more wheels of each main landing gear are all configured to facilitate movement of the aircraft along the ground in a longitudinal direction (for example by means of the wheel rolling on the ground), while resisting movement of the aircraft in a direction along the ground perpendicular to the longitudinal direction (for example by means of frictional forces between wheel and ground). The further retractable landing gear is configured for supporting at least some of the weight of the aircraft via a distal end of the landing gear. The distal end of the further retractable landing gear is so configured to facilitate movement of the aircraft in any direction along the ground (for example not providing any significant—optionally any non-negligible—resistance to movement of the aircraft in any direction along the ground, whether perpendicular or parallel to the longitudinal direction).

The further retractable landing gear may for example include a low friction support surface at its distal end. The low friction support surface may comprise a slide member. The low friction support surface may comprise means for generating an air cushion.

There is also provided a method of moving an aircraft on the ground. The aircraft may, for example, be an aircraft in accordance with the present invention according to any aspects described or claimed herein. The ground may be in the form of a flat support surface, for example an operating surface at an airport. The method may include the following steps being performed at the same time:

supporting a significant weight (for example at least 100 kN, and possibly more than 250 kN) of the aircraft with a first retractable landing gear, reacting a significant non-vertical load (for example arising from braking or steering) with the first retractable landing gear, (the load when resolved in a direction parallel to the support surface being greater than 1 kN, optionally more than 2 kN and possibly more than 10 kN for example), and supporting, with a second retractable landing gear, a significant weight (for example comparable with that supported by the first retractable landing gear—e.g. at least 50 kN, optionally at least 100 kN and possibly more than 200 kN of the weight of the aircraft and/or between 25% and 200% of the weight supported by the first retractable landing gear), wherein the greatest value of the load, if any, reacted by the second retractable landing gear, when resolved in any direction parallel to the flat support surface is significantly less (e.g. less than 25%, optionally less than 10%, and possibly less than 5%) than the non-vertical load reacted by the first retractable landing gear (when resolved in the direction parallel to the support surface load).

The structure and mounting of the second retractable landing gear may thus be designed to react vertical loads with little structure being required to react non-vertical loads. The second retractable landing gear may be provided with a low friction lower support surface for engaging the ground, for example a mechanism arranged to generate an air cushion from a source for generating compressed air.

It is preferred that the second retractable landing gear reacts negligible loads in any direction parallel to the support surface. For example, the greatest load if any when resolved in any direction parallel to the flat support surface may be less than 5%, and optionally less than 1%, of the resolved load reacted by the first retractable landing gear. The greatest load if any when resolved in any direction parallel to the flat support surface may be less than 1 kN, and possibly less than 500N.

It may additionally/alternatively be the case that the maximum torsion sustained (for example including any bending moment sustained) in the first retractable landing gear is greater than 1 kN, optionally more than 2 kN, and possibly more than 5 kNm. It may be the case that the maximum torsion or bending moment sustained in the second retractable landing gear is less than 500 Nm, optionally less than 200 Nm, and possibly less than 100 Nm.

The method may be performed in respect of a fixed wing commercial aircraft, which moves relative to an airport operating surface during one of take-off, landing, and taxiing. During such movement it may be that some of the weight of the aircraft is supported by a wheeled main landing gear and some of the weight of the aircraft is supported by a non-wheeled landing gear.

There is also provided a landing gear assembly for use in an aircraft or a method in accordance with the present invention according to any aspects described or claimed herein. Such a landing gear assembly may include a blower, for example for generating a source of compressed air which is then used to create an air cushion effect.

The aircraft may be one incorporating any other aspect of the invention as described or claimed herein.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
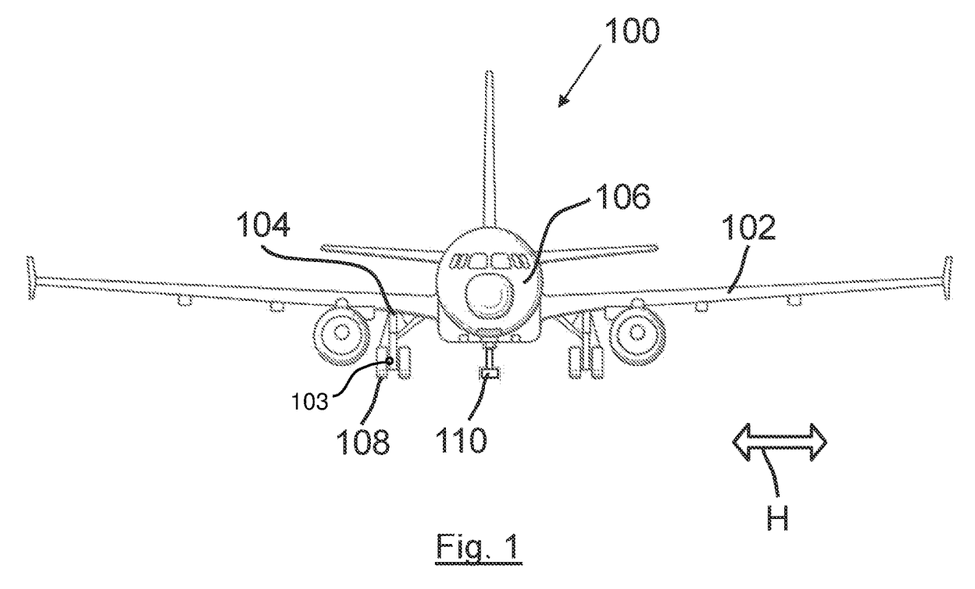
FIG. 1 shows an aircraft with a landing gear configuration according to a first embodiment of the invention.

FIG. 1 shows an aircraft in accordance with a first embodiment of the invention. The aircraft 100 comprises two wings 102 and four retractable landing gear assemblies (three of which being shown in FIG. 1). There are two main landing gear assemblies 104, each being mounted on a respective wing of the aircraft. The two main landing gear assemblies each fold inboard to be stowed partially within the fuselage 106. A nose landing gear is also provided (removed from view in FIG. 1). The two main landing gear assemblies 104 and the nose landing gear each carry two wheels 108 arranged coaxially on a single axle (in diablo formation) for rolling on the ground when the aircraft is on the ground. The aircraft 100 has a maximum take-off weight (MTOW) of about 120 tonnes, and an operating empty weight of about 65 tonnes. The weight of the aircraft is therefore just over the weight at which it would be appropriate for only six wheels to carry the entire weight of the aircraft. In accordance with the present embodiment, there is also provided a non-wheeled central landing gear assembly 110, which in use shares the weight of the aircraft when on the ground, thus enabling the aircraft still to have only six wheels between the multiple wheeled landing gears.

The non-wheeled central landing gear assembly 110 sustains compressive loads in the vertical direction, and negligible, shear, torsion, lateral or longitudinal loads. This is achieved by making the underside of the central landing gear assembly a low-friction surface. In this embodiment the low-friction surface is formed by a cushion of air formed by a source of compressed air and an air cushion device. By means of the low-friction contact with the ground the central landing gear can be slender in shape and have a relatively low mass structure. The structure to which the central landing gear is mounted may also be relatively lightweight and slender given that the loads to be reacted are effectively compressive loads aligned in substantially one and the same direction. In this embodiment, it will be appreciated that an air cushion refers to the effect created by high pressure air reducing friction with the ground by means of an gap between the operating surface (i.e. ground) and the immediately adjacent structure of the landing gear assembly, while also reacting vertical loads therebetween.

The loads on the central landing gear 110 can be contrasted with those on the two main landing gear 104 as follows. Each main landing gear (MLG) has a brake assembly 103 for applying a braking force to the MLG wheels. When braking, the resulting loads are transferred via the landing gear structure into the fuselage and wings. As such, each MLG is configured to transmit non-vertical (braking) loads to the rest of the aircraft. The MLG is therefore relatively bulky and massive. The central landing gear (CLG) provides little (negligible) braking/drag loads as a result of friction between ground and CLG and thus does not need to be structured to transmit non-vertical (braking) loads to the rest of the aircraft.

The MLG 104 each have two wheels 108 which can generate significant torsional loads in the landing gear when the aircraft is turning on the ground for example. Each wheel 108 is configured to facilitate movement of the aircraft along the ground in a longitudinal direction (i.e. when the wheel rotates about its axis) while resisting movement of the aircraft in a direction (labelled H in FIG. 1) along the ground perpendicular to the longitudinal direction (i.e. the wheel has a tyre that grips the surface on which the wheel rolls thus resisting movement of tyre along the ground in a direction parallel to the axle axis). The CLG facilitate movement along the ground in any direction (there being little or negligible difference in the coefficient of friction in one direction along the ground versus another direction).

Thus once the CLG has been designed to have a shape and mass that provides sufficient structural strength to sustain and transit the vertical weight-only loads into the aircraft there is no need for any extra structure for reacting or transmitting any non-vertical loads into the aircraft (such as requited of the MLG when wheel-braking is applied or when the aircraft turns on its wheels). The CLG 110 is therefore relatively slender and lightweight.

Figure 2:
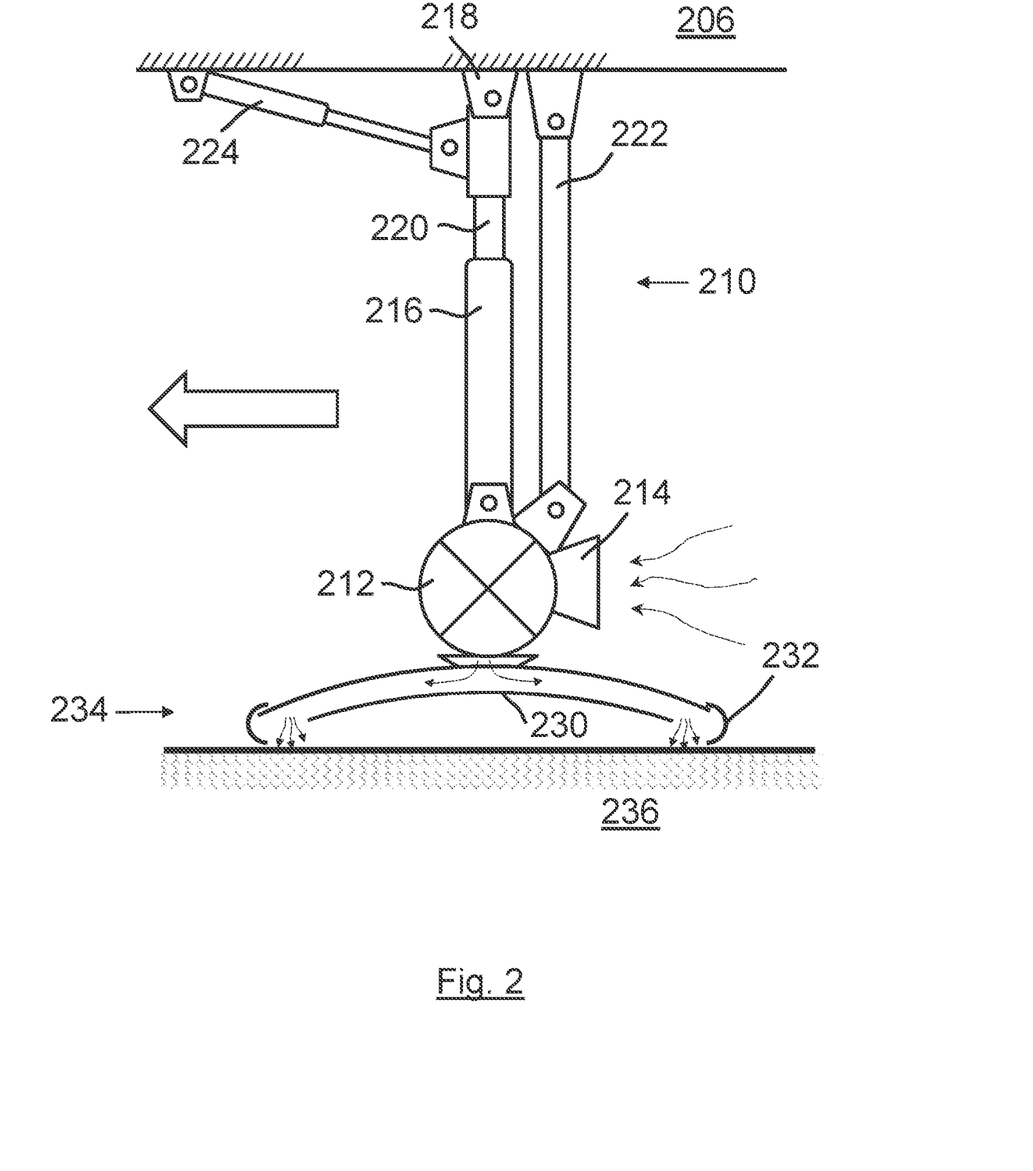
FIG. 2 shows a side view of a deployed landing gear assembly according to a second embodiment.
Figure 3:
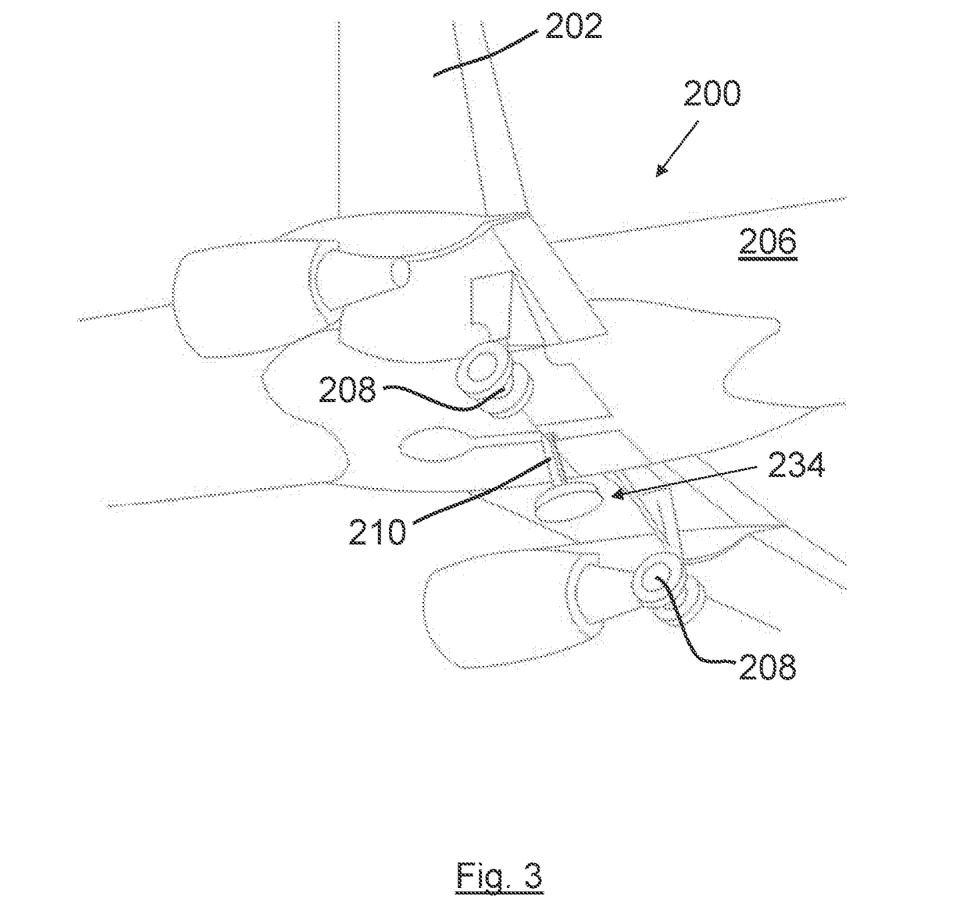
FIG. 3 shows a perspective view of the LG assembly of the second embodiment, also when deployed.
Figure 4:
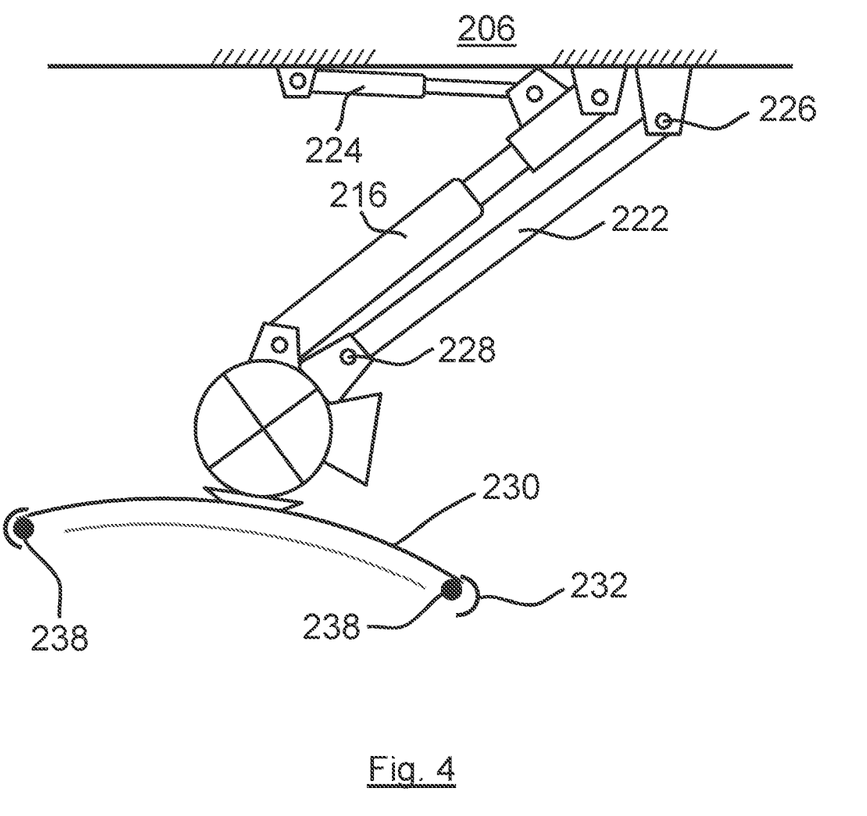
FIG. 4 shows a side view of the LG assembly of the second embodiment during the process of moving the LG between its deployed and stowed positions.

A second embodiment is shown in FIGS. 2 to 4, and relates to an air cushion device 210 for use as a landing gear on an aircraft, for example an aircraft as shown in FIG. 1. The reference numerals for the second embodiment are in the format 2XX, where last two digits (XX) are the same as between similar parts in the first and second embodiments. The aircraft 200 has two wheeled MLGs each carrying two wheels 208. The device 210 is shown in FIGS. 2 and 3 mounted to an aircraft fuselage 206, and in its deployed position. The device includes two independently powered air blowers 212 (one for back-up purposes) which each comprises a series of electrically powered air compressors, which draw air from an aft-facing inlet 214. Compressed air is delivered as an annular ring of high pressure via an air plate 230 and associated skirt 232. The device has a main load-bearing strut 216 mounted for rotation about a fixing 218 attached to the fuselage. The load-bearing strut includes a frangible portion 220, which is designed to fail if the CLG is over-loaded in certain failure cases, so that the CLG fails in a controlled manner in preference to causing structural damage in the region of its mounting to the fuselage.

The air cushion device 210 includes a pitch trimmer 222 that will be explained with reference to FIG. 4. FIG. 4 shows the air cushion device 210 as it is being stowed—between the fully deployed position shown in FIG. 2 and the fully stowed position (not shown in the Figures). A hydraulic actuator 224 is provided for the purpose of moving the CLG between its deployed position and its stowed position. It will be seen that the geometry of the pitch trimmer 222, its mounting 226 to the fuselage 206 and its mounting 228 to the lower part of the CLG, causes the air plate and skirt to be maintained relatively horizontal as they are raised/retracted. This enables the device to adopt a relatively shallow profile when stowed.

Air passes from the air blower 212 over the plate 230 and out through a ring of air holes arranged at the periphery of the lowermost end 234 of the device 210. The skirt 232 assists in maintaining air pressure in the region near the ground 236. (It will be appreciated that the skirt does not contain the air cushion on all sides, in that a portion of the underside of the device is not closed by the skirt.) The arrangement of the skirt and the air-flow geometry may be in accordance with conventional air cushion generating means and/or of hovercraft-type vehicles of the prior art.

It is estimated that for an air cushion to be strong enough to provide the load bearing capacity required, the air pressure of the air immediately beneath the skirt 232 needs to be around 5 atmospheres.

The contact region (or region of closest proximity) between skirt and ground has a generally circular shape, with a diameter of about 2.5 m and an area of about 5 m$^2$. (It will be appreciated that the skirt may not touch the ground very much, if at all, when the air cushion is functioning properly.) Adjacent to the skirt there is provided a ring 238 of elastomeric material (only shown in FIG. 4) which is able to act as an alternative means of support when the aircraft is stationary and the air blower 212 is powered down. For example, the ring 238 of material could be in the form of a flexible bladder around the circumference of the air cushion device, the bladder being inflated with a fluid so as to distribute the aircraft load on to the ground when the aircraft is in a power off condition.

Figure 5:
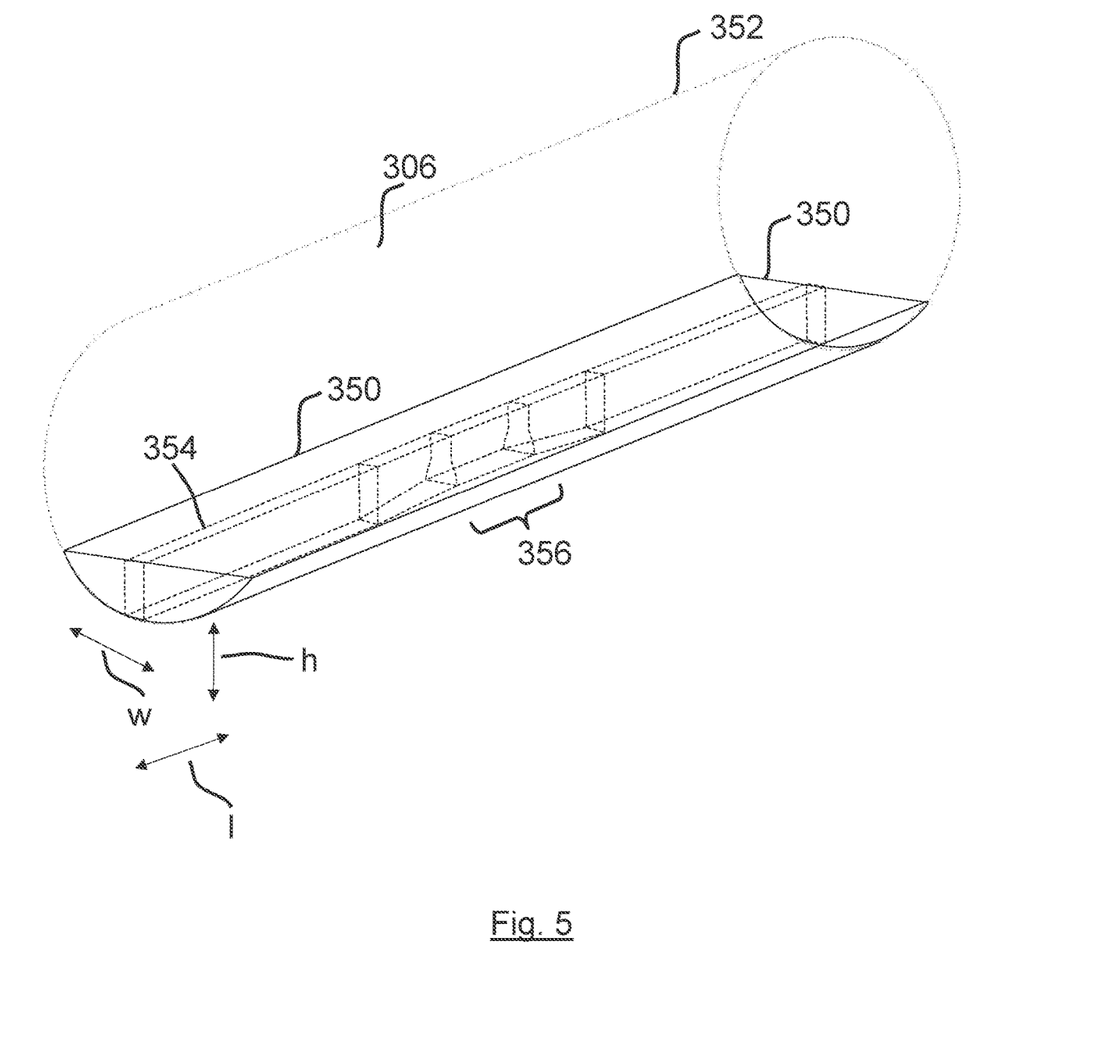
FIG. 5 shows a perspective view of a fuselage of an aircraft according to a third embodiment.

A third embodiment is shown in FIG. 5, which shows schematically (in a dash-dot line 352) a section of the fuselage 306 of the aircraft in the region where a non-wheeled CLG (not shown in FIG. 5) is to be mounted. The reference numerals for the third embodiment are in the format 3XX, where last two digits (XX) refer to similar parts as described above. The Figure (which is not to scale or in proportion) shows in solid line 350 a region (not representative of the structure of the fuselage) of the fuselage 306 which needs extra structural strengthening (and/or better distribution of loads) as a result of loading from the MLGs (not shown in FIG. 5) and as a result of the provision of landing gear bays, and doors, for the stowage of the MLGs. An aircraft is typically provided with an I-beam, which acts as a keel beam, to provide the extra strength and load paths. A wheeled CLG and its associated structure would not fit in the space that could be provided if a central keel beam were also provided. Such a keel beam would need to be replaced with something else normally if a wheeled CLG were to be provided. Two parallel keel beams being disposed on opposite sides (port and starboard) of the longitudinal mid-plane of the aircraft would be one such alternative arrangement. The use of a non-wheeled CLG (not shown in FIG. 5), for example according to either the first or second embodiment, with its slender and low-volume envelope when stowed, does not preclude the use of a central keel beam. In this embodiment, a single centrally disposed I-beam (the general extent of which being shown schematically in FIG. 5 by means of a dashed line 354) is provided which extends in the longitudinal direction, l. For a portion of the beam in a region 356 that corresponds to the bay in which the CLG is stowed, the beam is thicker in width (w) but shorter in height (h). The CLG may thus be stowed in this region, and mounted to the beam, without there being a need to provide two parallel beams or the like.

Figure 6:
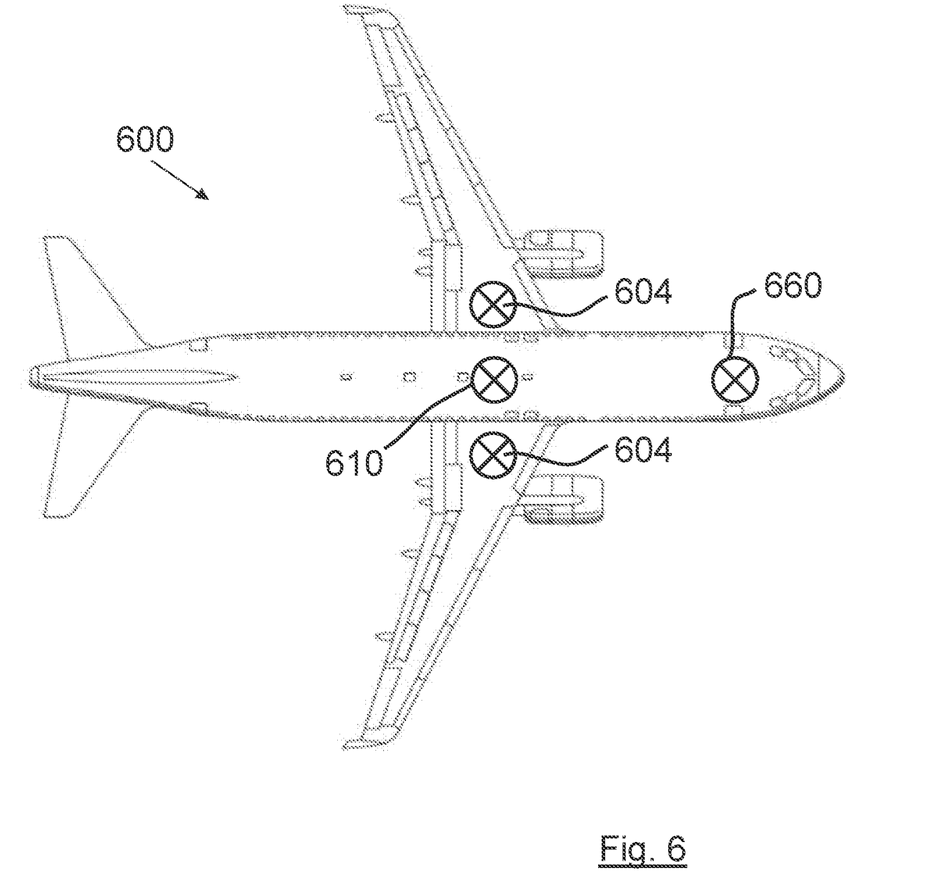
FIG. 6 shows an aircraft illustrating the method according to a fourth embodiment of the invention.

With reference to the highly schematic diagram shown in FIG. 6, there is now described an embodiment in which an aircraft 600 with four landing gear assemblies taxis on an airport operating surface. The four landing gear assemblies consist of a two-wheeled NLG (the location in plan of which being represented in FIG. 6 by the circular symbol 660), two two-wheeled MLGs (the location in plan of which being represented in FIG. 6 by the circular symbols 604) and a non-wheeled, low friction, CLG (the location in plan of which being represented in FIG. 6 by the circular symbol 610). The CLG 610 may be, but need not be, in the form of a CLG of any of the other illustrated embodiments. All landing gear assemblies of the aircraft are in contact with the runway, and at least 90% of the mass of the aircraft 600 is supported via the landing gear assemblies. Thus at least some—and possibly substantially all—of the weight of the aircraft is supported by and distributed between the four landing gear, as the aircraft moves along the operating surface. At a given instant, the aircraft is travelling at greater than 30 km/hour. The MLGs 604 and the CLG 610 each support at least 100 kN of the weight of the aircraft. The nose landing gear 660 supports less weight than the MLG 604. The aircraft 600 then turns, and thus each of the MLGs 604 experiences loads/torsion that are at least ten times higher than the equivalent loads experienced by the CLG 610, as a result of the low-friction engagement of the CLG with the ground. Given the lower loading experienced by the CLG in directions other than in the vertical (weight-bearing) direction, the CLG can be made to be relatively lightweight.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In some embodiments it may be possible to create an air cushion without the need to provide a skirt.

More than one non-wheeled LG could be provided.

Means other than an air cushion could provide the low-friction effect of the CLG.

The source of compressed air for the air cushion could be provided from a source on the aircraft and not on or in the LG.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The term 'or' shall be interpreted as 'and/or' unless the context requires otherwise.

The invention claimed is:

1. A fixed wing aircraft, comprising:
   at least one landing gear assembly configured to support some but not all of the weight of the aircraft via one or more wheels and having at least one brake assembly for applying a braking force to a wheel of the landing gear, and
   at least one retractable landing gear assembly configured to support some but not all of the weight of the aircraft via one or more air cushions,
   wherein said at least one retractable landing gear assembly is movable between a deployed position and a stowed position.

2. An aircraft according to claim 1, wherein the aircraft has a maximum take-off weight of between 100 and 150 tonnes.

3. An aircraft according to claim 1, wherein said at least one landing gear assembly configured to support some but not all of the weight of the aircraft via one or more wheels comprises a first main landing gear assembly on a port side of the aircraft and a second main landing gear assembly on a starboard side of the aircraft.

4. An aircraft according to claim 3, wherein each of the first and the second main landing gear assemblies is a single axle landing gear with two wheels.

5. An aircraft according to claim 1, wherein said at least one landing gear assembly configured to support some of the weight of the aircraft via one or more wheels comprises a nose landing gear assembly.

6. An aircraft according to claim 1, wherein the aircraft is configured for landing and take-off with the use of eight or fewer landing gear wheels.

7. An aircraft according to claim 1, wherein said at least one landing gear assembly configured to support some of the weight of the aircraft via one or more air cushions comprise a central landing gear.

8. An aircraft according to claim 7, wherein the aircraft comprises a fuselage having a structural beam which extends along the centre line of the fuselage.

9. An aircraft according to claim 1, wherein said at least one landing gear assembly configured to support some but not all of the weight of the aircraft via one or more air cushions comprises a skirt adapted to contain the air cushion.

10. An aircraft according to claim 1, wherein said at least one landing gear assembly configured to support some but not all of the weight of the aircraft via one or more air cushions is adapted to create an annular air cushion.

11. An aircraft according to claim 1, wherein said at least one landing gear assembly configured to support some but not all of the weight of the aircraft via one or more air cushions comprises a ring of elastomeric material adapted to support some of the weight of the aircraft in the absence of the one or more air cushions.

12. An aircraft according to claim 1, wherein said at least one landing gear assembly configured to support some but not all of the weight of the aircraft via one or more air cushions comprises a landing gear leg pivotally mounted at one end to the aircraft.

13. An aircraft according to claim 1, wherein said at least one landing gear assembly configured to support some but not all of the weight of the aircraft via one or more air cushions comprises a pitch trimmer member.

14. An aircraft comprising:
   a retractable nose landing gear,
   a first retractable main landing gear which includes one or more wheels and is mounted on a port side of the aircraft,
   a second retractable main landing gear which includes one or more wheels and is mounted on a starboard side of the aircraft, each of the first and second retractable main landing gear having at least one brake assembly for applying a braking force to a wheel of the landing gear, the one or more wheels of each main landing gear all being configured to facilitate movement of the aircraft along the ground in a longitudinal direction while resisting movement of the aircraft in a direction along the ground perpendicular to the longitudinal direction, and a third retractable landing gear which is configured for supporting at least some of the weight of the aircraft via a distal end of the landing gear, the distal of the landing gear being so configured to facilitate movement of the aircraft in any direction along the ground.

15. A method of moving an aircraft having a first retractable landing gear with one or more wheels, and a second retractable landing gear with one or more air cushions, on a flat support surface including at the same time supporting at least 100 kN of the weight of the aircraft with the first retractable landing gear, supporting, with the second retractable landing gear, at least 100 kN of the weight of the aircraft, and between 25% and 200% of the weight supported by the first retractable landing gear, and reacting a load with the first retractable landing gear, such that (a) the load when resolved in a direction parallel to the support surface is greater than 1 kN and the greatest value of the load, if any, reacted by the second retractable landing gear, when resolved in any direction parallel to the flat support surface being less than 10% of the resolved load reacted by the first retractable landing gear and/or (b) the maximum torsion sustained in the first retractable landing gear is greater than 1 kNm and the maximum torsion sustained in the second retractable landing gear is less than 500 Nm.

16. A landing gear assembly for an aircraft comprising at least one landing gear assembly configured to support some but not all of the weight of the aircraft via one or more wheels and having at least one brake assembly for applying a braking force to a wheel of the landing gear, at least one landing gear assembly configured to support some but not all of the weight of the aircraft via one or more air cushions, wherein said at least one retractable landing gear assembly is movable between a deployed position and a stowed position.

17. A landing gear assembly according to claim 16, further including an air blower arranged to produce an air cushion effect.

18. An aircraft, comprising:

at least one landing gear assembly configured to support some but not all of the weight of the aircraft via one or more wheels, at least one landing gear assembly configured to support some but not all of the weight of the aircraft via one or more air cushions, wherein landing gear assembly is movable between a deployed position and a stowed position, and wherein said at least one landing gear assembly configured to support some but not all of the weight of the aircraft via one or more air cushions comprises a landing gear leg pivotally mounted at one end to the aircraft.

19. An aircraft, comprising:

at least one landing gear assembly configured to support some but not all of the weight of the aircraft via one or more wheels, at least one landing gear assembly configured to support some but not all of the weight of the aircraft via one or more air cushions, wherein landing gear assembly is movable between a deployed position and a stowed position, and wherein said at least one landing gear assembly configured to support some but not all of the weight of the aircraft via one or more air cushions comprises a pitch trimmer member.

* * * * *